United States Patent [19]
Tagawa et al.

[11] Patent Number: 5,188,898
[45] Date of Patent: Feb. 23, 1993

[54] FERROMAGNETIC METAL PARTICLES AND PREPARATION PROCESS THEREOF

[75] Inventors: Kimiteru Tagawa, Setagaya; Seiichi Takahashi, Yokohama; Noritoshi Utsuno, Yokohama; Hideki Umehara, Yokohama; Fujio Hayashi, Fujisawa; Shigeo Kiba, Yokohama; Satoru Suda, Kamakura, all of Japan

[73] Assignee: Mitsui Toatsu Chemicals, Incorporated, Japan

[21] Appl. No.: 667,401

[22] PCT Filed: Aug. 8, 1990

[86] PCT No.: PCT/JP90/01011
§ 371 Date: Apr. 4, 1991
§ 102(e) Date: Apr. 4, 1991

[87] PCT Pub. No.: WO91/02366
PCT Pub. Date: Feb. 21, 1991

[30] Foreign Application Priority Data
Aug. 9, 1989 [JP] Japan ................................. 1-204852

[51] Int. Cl.$^5$ .............................................. B32B 5/16
[52] U.S. Cl. .................................... 428/403; 427/127; 427/216; 427/217
[58] Field of Search ................ 428/403; 427/127, 216, 427/217

[56] References Cited
U.S. PATENT DOCUMENTS

| | | | |
|---|---|---|---|
| 4,066,565 | 1/1978 | Sasazawa et al. | 427/127 |
| 4,296,149 | 10/1981 | Rudolf et al. | 427/427 |
| 4,770,903 | 9/1988 | Schwab et al. | 427/127 |
| 4,876,022 | 10/1989 | Yamazaki et al. | 252/62.56 |
| 4,911,957 | 3/1990 | Oishi et al. | 427/217 |

FOREIGN PATENT DOCUMENTS 176902 10/1983 Japan ................................. 427/217

*Primary Examiner*—Edith Buffalow
*Assistant Examiner*—Mark A. Forman
*Attorney, Agent, or Firm*—Sixbey, Friedman, Leedom & Ferguson

[57] ABSTRACT

Ferromagnetic metal particles the surface layer of which comprises laminatedly covered films of a ferrite compound having a spinel structure of at least one metal selected from cobalt, zinc, manganese, aluminum, chromium, nickel and copper and iron and a preparation process thereof.

The particles can be used as a high density magnetic recording medium.

16 Claims, 7 Drawing Sheets

KINETIC ENERGY

BOND ENERGY

FERROMAGNETIC METAL PARTICLES AND PREPARATION PROCESS THEREOF

TECHNICAL FIELD

This invention relates to ferromagnetic metal particles which are a magnetic powder used for magnetic recording media suitable for high density recording, and the surface layer of which characteristically comprises laminatedly covered films of a ferrite compound having a spinel structure composed of iron and at least one metal selected from cobalt, zinc, manganese, aluminum, chromium, nickel and copper, and a preparation process thereof.

BACKGROUND ART

Customarily, the magnetic powder used for magnetic recording media, represented by audio and video tapes, has been predominantly of γ-iron oxide and of Co-γ-iron oxide.

In recent years, high density magnetic recording media have been desired.

It has been known that ferromagnetic metal particles composed primarily of metallic iron or an alloy thereof obtained by the catalytic reduction of a powder mainly comprising iron oxyhydroxide or iron oxide with a reducing gas possess a high coercive force and high saturation magnetization. Thus, these particles have been investigated as high density magnetic recording media.

High density magnetic recording media for audio and video applications are demanded to produce higher outputs and less noises in broad frequency bands.

Factors demanded for the magnetic particles for this purpose are such that the size of the particles should be more minute, their shape be acicular or prismatic, they be more stable to oxidation, and they should maintain high saturation magnetization after environmental deterioration or corrosion tests.

Several processes have been proposed to date to obtain powdery ferromagnetic metal particles composed of iron or primarily of iron by heating and reducing iron or metallic compounds composed mainly of iron as a starting material in a reducing atmosphere.

(1) For example, Japanese Patent Laid-Open No. 134858/1977 discloses a process for producing ferromagnetic metallic iron comprising doping iron oxyhydroxide or oxide with specific elements to form a starting material, attaching the hydroxide of Si or Al to the starting material and subsequently heating and reducing the resulting material.

(2) Japanese Patent Laid-Open Nos. 122663/1979 and 2664/1979 (GB 2016526) describe processes for producing ferromagnetic metallic iron by heating and reducing iron oxyhydroxide or oxide with or without specific elements doped, which has been attached with the hydroxide of Zn, Cr, Cu, Co, Ni, Mn or Sb.

(3) Japanese Patent Laid-Open No. 173209/1984 teaches a process for producing ferromagnetic metal particles comprising neutralizing aqueous solutions containing a compound of Mg, Ti, Mn, Co, Ni, Cu or Zn and ferrous ions ($Fe^{2+}$) individually to form the hydroxides, blowing thereto air to convert them spinel-type compounds, attaching these compounds onto iron oxyhydroxide particles, and reducing the resulting materials.

(4) The iron or a metal mainly comprising iron obtained by heating and reduction tends to be oxidized or burned in the air when left as it is, and hence its magnetic property is degraded time-dependently with the progress of oxidation. Then, Japanese Patent Laid-Open No. 55503/1981 discloses a process for producing metallic magnetic powder excellent in corrosion resistance by further forming oxide films on the surface of the aforesaid metal particles in the atmosphere of low oxygen concentrations.

As described above, the demand for ferromagnetic metal particles as a magnetic powder for high density recording is such that the particles be more minute without impairing high saturation magnetization.

Thus, many further difficulties are left, including imparting the stability to oxidation to the minute particles and controlling the morphology of the minute particles by preventing their sintering.

The following problems are involved in the prior art processes by way of example.

(1) In the process for producing ferromagnetic metal particles by the attachment of the hydroxide of Al or Si to iron oxyhydroxide, etc. followed by reduction, the more minute the particles, the more serious is their sintering, so that it is difficult to maintain their morphology.

Further, even if oxide films are formed on the surface of the metal particles by gradual oxidation, this hardly has the effect of preventing the progress of oxidation.

(2) In the process of producing ferromagnetic metal particles comprising attaching a metal hydroxide obtained by neutralizing an aqueous solution of Zn, Cr, Cu, Co, Ni, Mn or Sb to iron oxyhydroxide or oxide with or without specific elements doped and reducing the resulting material, the metal hydroxide obtained by the neutralization have high crystallization rate so that it grows to form crystalline particles with the same or larger size than that of the iron oxyhydroxide particles. As a result, said metal hydroxide particles can hardly attach to the iron oxyhydroxide particles. Consequently, the metal hydroxide particles and the crystalline iron oxyhydroxide particles are present independently, forming a simple mixture.

On heating and reducing such a mixture, it is often observed that the reduced metal particles no longer have the morphology of the original particles but they collapse or sinter to each other. Further, in these particles, it is also observed that metal particles or oxide particles derived from the reduction of the metal hydroxide particles are admixed.

Further, the formation of oxide films by gradual oxidation of the reduced ferromagnetic metallic iron particles with a small amount of oxygen does little to prevent the progress of oxidation of the particles.

(3) In the process of obtaining ferromagnetic metal particles by neutralizing Mg, Ti, Mn, Co, Ni, Cu or Zn ions and ferrous ions to form the hydroxides, oxidizing them with air to convert them into a spinel compound, and covering/attaching the compound onto acicular iron oxyhydroxide followed by heating and reduction, there has been such a disadvantage that if the constituent elements in the spinel compound are 6 atom % or more per Fe atom in the iron oxyhydroxide, the degree of the covering/attaching reaches saturation and the spinel compound is isolated from the surface of the iron oxyhydroxide in the step of covering/attaching the particles of the spinel compound onto the iron oxyhydroxide particles.

Further, in this case also, the formation of oxide films by gradual oxidation of the reduced ferromagnetic metallic iron particles with a small amount of oxygen has little effects of preventing the progress of oxidation.

DISCLOSURE OF THE INVENTION

It is the object of the present invention to provide ferromagnetic metal particles which have a high coercive force and saturation magnetization and yet ar more minute in particle size than usual, are acicular or prismatic in shape,. are stable to oxidation, and maintain a high saturation magnetization even when subjected to environmental deterioration or weathering tests.

The present inventors have made intensive investigations to attain the foregoing object, leading to completion of the present invention.

The fundamental technological idea will be illustrated to grasp the present invention definitely.

First, a gel is formed by the simultaneous neutralization of bivalent ions of Co, Zn, Mn, Ni or Cu and ferric ions ($Fe^{3+}$) or tervalent ions of Al or Cr and ferrous ions ($Fe^{2+}$). For example, the X ray diffraction spectrum of a gel formed from $Co^{2+}$ and $Fe^{3+}$ is shown in FIG. 1. The drawing tells the following:

(1) the gel has a spinel structure in view of the angle of diffraction, (2) it is minute crystals in view of the broad line width, and (3) the crystals are incomplete because of the presence of a halo (may also be called crystals of low crystallinity).

The results signify that the gel comprises a complex metal hydroxide or oxide, which is a ferrite compound having a spinel structure composed of ultrafine particles of a very low crystallinity.

Further, the gel thus formed is found to be not ferromagnetic but rather paramagnetic from the measurement of its magnetic property at room temperature. Judging also from the fact that it has a spinel structure, the gel may be referred to as super paramagnetic particles.

In consequence, the complex metal hydroxide or oxide may be said ultrafine particles of a ferrite compound having a spinel space lattice structure locally.

Then, a salt of iron and at least one salt of a metal selected from cobalt, zinc, manganese, aluminum, chromium, nickel and copper are neutralized simultaneously in a slurry in which particles of the oxyhydroxide of mainly iron are dispersed. The gel produced directly as a spinel compound at the same time with the neutralization forms immediately laminatedly covered films on the surface of said oxyhydroxide particles.

This formation of laminatedly covered films on the whole surface of the oxyhydroxide particles can be confirmed by the observation of the resultant particles with an electronic microscope.

Further, the measurement of the magnetic property of said particles reveals that they are not ferromagnetic but paramagnetic.

From these results, the laminatedly covered films in this invention are assumed to be those having locally a spinel space lattice structure.

Further, the X-ray photoelectron spectroscopy (hereinafter abbreviated as XPS) of the surface of the particles formed, for example, from the particles of the oxyhydroxide mainly of iron and $Co^{2+}$ and $Fe^{3+}$ is shown in FIGS. 2 and 3.

From these drawings, it is found that the valencies of the metals on the surface of the particles are $Co^{2+}$ and $Fe^{3+}$.

Thus, the ferrite compound with a spinel structure of ultrafine particles obtained according to the present invention consists of extremely minute units relative to the oxyhydroxide particles, or it forms a spinel space lattice structure locally. When the metallic ions are neutralized simultaneously in the presence of iron oxyhydroxide particles to convert them directly into a ferrite having a spinel structure, its accumulation proceeds on the whole surface of the oxyhydroxide particles to form laminatedly covered films. For all that, since such a phenomenon as peeling is scarcely seen even with a large degree of its accumulation, the thickness of the ferrite film layer having spinel structure can be controlled at will.

It is observed by means of an electron microscope, etc. that in the reaction in which particles of the oxyhydroxide primarily of iron which have ferrite films of ultrafine spinel structure on the surface, obtained according to the present invention, are heated and reduced to form ferromagnetic metal particles, the original morphology of the particles is maintained without suffering from collapse and sintering. From this fact, it is assumed that the properties of the films contribute to the excellent morphological retention effects.

Said ferromagnetic metal particles have marked effects of preventing the progress of oxidation. Moreover, the formation of oxide films on the surface of the ferromagnetic metal particles by gradual oxidation of the surface may also contribute to the prevention of the progress of oxidation.

Then, for the comparison with the present invention, a conventional technique will be briefly illustrated, wherein ferromagnetic metal particles are obtained by neutralizing Mg, Ti, Mn, Co, Ni, Cu or Zn ions and ferrous ions (bivalent-bivalent system) to form the hydroxides, oxidizing the hydroxides with air to form a spinel compound, covering the compound onto acicular iron oxyhydroxide, and heating and reducing the resultant product.

First, in the course of neutralizing the specific metal and ferrous ions (bivalent-bivalent system) to form the hydroxides, crystalline particles of ferrous hydroxide and those of the metal hydroxide are formed. The analysis of the X-ray diffraction spectroscopy of these particles clarifies that they have no spinel structure and the line width is so narrow that the crystals are large.

The analysis of the X-ray diffraction spectroscopy of the particles formed by oxidizing these crystalline particles with air in the subsequent step reveals the following:

(1) a compound having a spinel structure is formed, (2) the line width is narrow and hence the crystals are large, and (3) no presence of halo shows that the crystals are complete (the crystallinity is very high).

The measurement of the magnetic property of the particles thus formed shows that they are ferromagnetic and that they are particles of large sizes also as magnetic units. From the foregoing, it is confirmed that the particles formed by oxidizing the metal hydroxides with air are those of a spinel compound. This invention is based on the technological idea that the particles of the spinel compound are allowed to cover/attach to the particles of iron oxyhydroxide.

Separately, there is also such a technological idea that iron oxyhydroxide particles having metal ions doped are made into an alloy at high temperatures to produce ferromagnetic metal particles.

The present inventors have made research and development under such fundamental ideas to attain the above-described object, leading to completion of the present invention, that is, ferromagnetic metal particles and a preparation process thereof.

Thus, the present invention provides ferromagnetic metal particles whose surface layer comprises laminatedly covered films of a ferrite compound having a spinel structure composed of iron and at least one metal selected from cobalt, zinc, manganese, aluminum, chromiun, nickel and copper, and a preparation process thereof.

Moreover, said ferrite compound having a spinel structure is characteristically a complex oxide comprising a bivalent metal and a tervalent metal.

The present invention further provides ferromagnetic metal particles obtained by heating and reducing the acicular oxyhydroxide of mainly iron having the surface covered with the films of spinel ferrite or spinel ferrite hydrate, which have the aforesaid structure as basic units, and then bringing the resulting particles into contact with air for their stabilization.

The films of the ferrite compound having a spinel structure comprising iron and at least one metal selected from cobalt, zinc, manganese, aluminum, chromiun, nickel and copper on the surface of the ferromagnetic metal particles of the present invention may be identified by investigating X-ray diffraction images in the powder method of the ferromagnetic metal particles and by studying XPS.

XPS is an analytical approach based on the electron spectroscopy for clarifying constituent elements on the surface of a solid or their chemical conditions. In this approach, X-ray is irradiated onto the surface of a solid sample so that photoelectrons are released from the elements on the surface excited by the X-ray. By measuring the kinetic energy of the photoelectrons, the bond energy of the electrons is determined, thus permitting the elements to be identified and their chemical bond conditions to be investigated.

By such an approach, the constituent elements on the surface and their valencies can be determined.

Further, by the combined use of the analysis of X-ray powder diffraction spectroscopy and the means of electron microscope, magnetic measurement, etc., it is confirmed that the ferromagnetic metal particles of the present invention have laminatedly covered films of a ferrite compound having a spinel structure comprising iron and at least one metal selected from cobalt, zinc, manganese, aluminum, chromium, nickel and copper on the surface. The particles have good enough shape as the fine particles meeting the object of the present invention and are also superb in oxidation stability.

The ferrite films having a spinel structure on the ferromagnetic metal particles of the present invention are investigated in full detail by the use of X-ray powder diffraction. As a result, it is confirmed, for example, that there exists the X-ray powder diffraction spectrum of the ultrafine particles obtained by simultaneous neutralization of ferrous ions and bivalent cobalt ions, from the analysis of the X-ray powder diffraction spectroscopy of the ferromagnetic metal particles of ferrous ions and bivalent cobalt ions obtained according to the present invention.

Further, as a result of the constitutional analysis of the surface elements by XPS, $Co^{2+}$ and $Fe^{3+}$ are observed as shown in FIGS. 4 and 5, and hence the presence of a complex oxide of iron and cobalt is confirmed in the film structure.

Accordingly, judging jointly from the analytical results by XPS, etc., it is found that the fundamental film structure of the surface layer of the metal particles succeeds well to the spinel ferrite films on the surface of the iron oxyhydroxide.

The films of the ferrite compound having a spinel structure of iron and at least one metal selected from cobalt, zinc, manganese, aluminum, chromium, nickel and copper on the surface of the particles of the oxyhydroxide mainly of iron according to the present invention comprise a complex oxide or hydroxide of bivalent and tervalent metals having primarily a spinel structure. These films are identified by the judgment according to X-ray powder diffraction and electron microscope observation and the constitutional analysis of the surface by XPS.

Further, in the present invention, no particular limitations are imposed on the size and shape of the particles of the oxyhydroxide primarily of iron o of the ferromagnetic metal particles. However, as the metallic magnetic powder for high density magnetic recording media showing the remarkable effects of the present invention, it is preferable to use ferromagnetic metal particulates the shape of which is acicular and the length of the major axis of which is at most 0.3 μm.

The ferromagnetic metal particles composed mainly of iron according to the present invention are characteristically excellent in antioxidation stability. The antioxidation stability is evaluated in such a way that in the method called corrosion test, ferromagnetic metal particles are allowed to stand under the conditions of a high temperature and high humidity (e.g. 60° C. and 90% relative humidity), and after a lapse of a given time (e.g. 1 week), their saturation magnetization ($\sigma s^*$) is measured for its judgment.

The values of saturation magnetization after such corrosion test vary widely with the constituent elements, the thickness of the laminatedly covered films, the length of the particles and the axis ratio. Since these values are generally not defined strictly, the preferred range of $\sigma s^*$ for metal particles for high density magnetic recording media is expressed by the following equation as a function of the length of the particles, not as an official standard but as a tentative standard.

Namely, the magnetic saturation ($\sigma s^*$) after one week standing at 60° C. and 90% relative humidity is expressed as:

$$\sigma s^* \text{ (emu/g)} > 80 + K \times \text{particle length (μm)}$$

Taking into consideration the maximum value for $\sigma s^*$ of the particles of prior art techniques, the constant K is:

$$K = 100$$

and considering the minimum value of $s^*$ of those of the present invention, the constant K is:

$$K = 150$$

Needless to say, this saturation magnetization ($\sigma s^*$) does not exceed the saturation magnetization inherent to the material.

There are no particular restrictions on the amount of cobalt, zinc, manganese, aluminum, nickel, chromium or copper contained in the ferromagnetic metal particles. However, an amount from 3% to 50% is preferred in the weight ratio to iron.

No limitations are placed on the inclusion of metallic and nonmetallic elements other than those described above a additional components. However, since the inclusion of such non-magnetic elements in large amounts unfavorably leads to the degradation of magnetization, it is preferable that the amount of non-magnetic elements included is at most 5%.

To promote the effect of protecting the morphology of the particles, it is preferable to add Si, P and B in a small amount.

The functions and effects of the present invention, which provides ferromagnetic metal particles characteristically having ferrite films with a spinel structure comprising a specific metal element and iron in the surface layer thereof and a preparation process thereof, are summarized as follows:

(1) the particle shape is practically similar to that of the oxyhydroxide particles, so that their acicular property is well maintained, (2) with regard to the particle size, even if the oxyhydroxide particles are so minute, the resulting particles hardly cause such ill effects as sintering on heating and reduction, and therefore minute ferromagnetic metal particles are obtained, (3) the thickness of the laminatedly covered films can be controlled at will, (4) the particles obtained have a high coercive force, (5) the particles obtained have a high saturation magnetization, (6) the particles obtained are superb in the stability to oxidation, (7) the particles obtained maintain a high saturation magnetization even after undergoing environmental deterioration or weathering test, and (8) the particles obtained characteristically meet satisfactorily the demands for higher outputs and less noises in broad recording frequency bands, regardless of whether they are for audio or video use as magnetic recording media.

In view of the effects as described above, the present invention provides ferromagnetic metal particles which are markedly improved in quality as a magnetic powder suitable for use as high density magnetic recording media and a preparation process thereof.

BEST MODE FOR PRACTICING THE INVENTION

Figure 1:
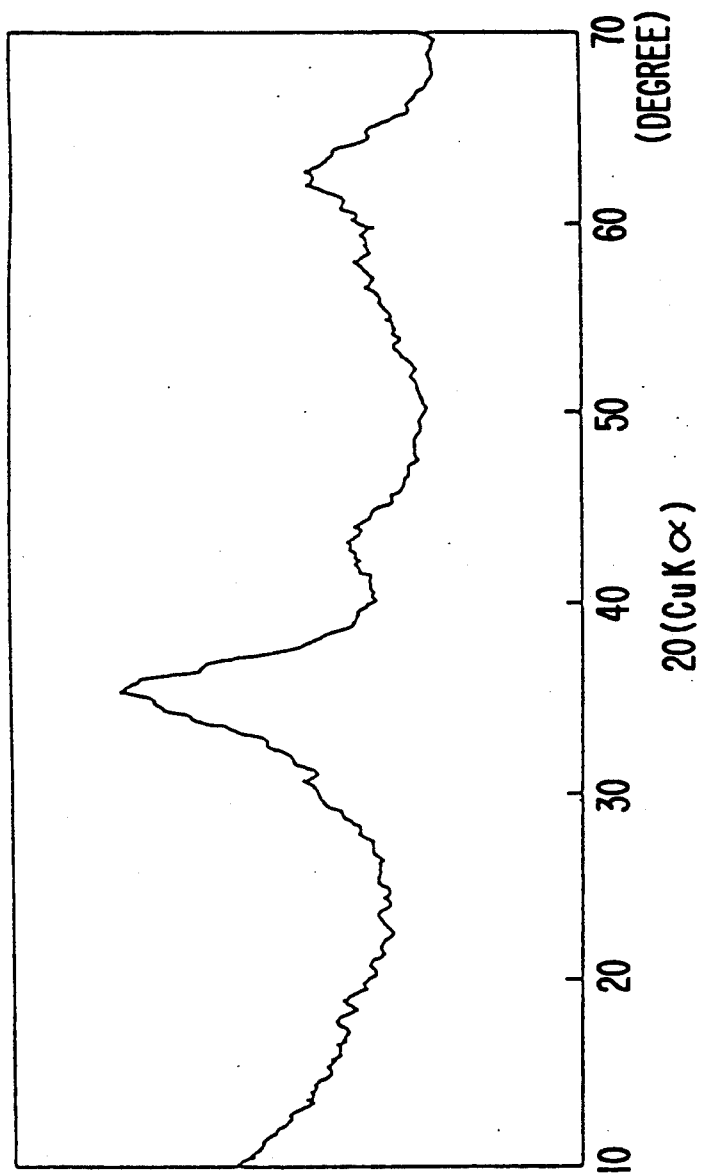
FIG. 1 is the X-ray diffraction spectrum of a gel powder formed by neutralizing an aqueous mixed solution of ferric nitrate and cobalt nitrate (Fe/Co=2/1 by mole).

The process of the present invention comprises a step wherein a salt of iron and at least one salt of a metal selected from cobalt, zinc, manganese, aluminum, chromium, nickel and copper having a different valency that the iron are neutralized simultaneously in a slurry, in which particles of the hydroxide mainly of iron are dispersed, and the gel thus formed as a spinel compound in one stage reaction simultaneously with the neutralization is covered as films on the whole surface of the oxyhydroxide particles to obtain covered particles (former step), and a step wherein the resultant covered particles are heated and reduced to produce ferromagnetic metal particles, the ferromagnetic metal particles being optionally oxidized slowly to prevent the progress of oxidation for the purpose of avoiding ignition (latter step).

More particularly, bivalent ions of at least one metal selected from cobalt, zinc, manganese, nickel and copper and ferric ions ($Fe^{3+}$) are neutralized simultaneously in a slurry having dispersed the oxyhydroxide mainly of iron, and the gel thereby formed as a spinel compound is directly covered as films on the whole surface of the oxyhydroxide particles. Further, tervalent ions of at least one metal selected from aluminum and chromium and ferrous ions are neutralized simultaneously and the gel thereby formed as a spinel compound is directly covered as films on the whole surface of the oxyhydroxide particles.

It is illustrated more specifically how the films are formed on the surface of the particles of the oxyhydroxide mainly of iron.

First, an aqueous slurry solution, in which particles of the oxyhydroxide mainly of iron are dispersed, is prepared.

It is possible to disperse the particles by a high speed stirrer such as homogenizer. Further, on the dispersion, it is preferable to add a dispersant, for example, a phosphate such as sodium orthophosphate, sodium tripolyphosphate and sodium hexametaphosphate and a silicate such as sodium metasilicate, sodium orthosilicate and water glass from the viewpoint of improving the dispersibility.

The pH of the aqueous slurry solution having dispersed particles of the oxyhydroxide mainly of iron is preferably alkaline because of the necessity of simultaneous neutralization of the constituent elements of the particles of spinel structure. A pH in the range above at least pH 9 is favored, pH 10 to 14 being more preferred.

It is not practically preferable to disperse the oxyhydroxide particles in an acidic solution followed by dissolution of the constituent elements in the solution, and then to neutralize the resulting solution with an alkaline agent, owing to the difficulty of simultaneous neutralization of the elements.

As the alkaline agent for use in pH control, any inorganic alkalline salts may be used. However, it is advisable to use NaOH which is inexpensive industrially. A slurry of at least pH 9 of the particles of the oxyhydroxide mainly of iron, which has been prepared in an alkaline condition, may also be used as it is.

The formation of spinel films is illustrated in the case of bivalent ions of cobalt, zinc, manganese, nickel or copper and ferric ions.

It is of course possible to form ferrite films in the manner as described below, also with tervalent ions of aluminum or chromium and ferrous ions.

The bivalent metal salts and ferric salts useful in the present invention may be inorganic acid salts such as sulfates, nitrates and chlorides and organic acid salts such as acetates.

The situations are the same with regard to the tervalent metal salts and ferrous salts. Iron nitrate may preferably be used as ferric ions due to the strong oxidizing property.

After preparation of an aqueous acidic mixed solution of bivalent ions of said metals and ferric ions, it is added slowly to the slurry of at least pH 9 of the oxyhydroxide particles while stirring at a high rate. Then, spinel films are formed simultaneously with neutralization.

At this time, since the bivalent ions of the metals have different critical pHs for neutralization from the ferric ions, the amount of the mixed solution added is so adjusted as to neutralize both ions at the same time with the addition, in order not to form independent precipitates. The pH of the slurry may further be regulated by the addition of an alkaline agent. It is desirable to regulate the pH strictly within a given range. To complete the neutralization rapidly, sufficient mixing and stirring of the slurry are desired.

The amount of the slurry, the amount of the solution added, and the condition of stirring are determined by taking out a portion of the slurry having the solution added and observing it with an electron microscope, for example, as to whether or not it has any free neutralized gel.

Insufficient mixing and stirring of the slurry and the use of acidic pH range may not cause the bivalent metal ions and ferric ions to be neutralized at the same time. Hence, both ions are individually converted to the independent hydroxide particles, resulting in no formation of films and mere scatter as foreign matters.

The temperature for the neutralization under normal pressure may be in the range of from the boiling point to the freezing point of water, preferably in the range of 20 to 50° C. from industrial standpoint.

The particles of the oxyhydroxide mainly of iron useful in the present invention have no particular limitations and hence may be produced by methods known per se in the art. Preferably, these are fine particles with a specific surface area of about 40 to 150 m$^2$/g, have an acicular shape, and may assume a crystalline morphology of either $\alpha$-, $\beta$- or $\gamma$-FeOOH. Further, coprecipitates of the iron oxyhydroxide with at least one element selected from P, Si, Al, Ti, Cr, Mn, Co, Ni, Zn, etc. may also be used satisfactorily.

Repeatedly speaking, important points in the present invention are in that the effects of the present invention can not be exhibited with the aforesaid metals alone but originate in the fact that iron and each metal are "neutralized at the same time in one reaction to convert them to a ferrite compound having a spinel structure which is immediately transformed to films". This may result in the formation of ferrite films having a spinel structure of incomplete crystals composed of ultrafine units on the surface of the particles of the oxyhydroxide mainly of iron.

When the resulting covered particles are heated and reduced to ferromagnetic metal particles, followed by gradual oxidation, ferrite films having a spinel structure are formed on the whole surface of the ferromagnetic metal particles, thereby obtaining particles which exhibit remarkable effects as ferromagnetic particles for magnetic recording.

The atomic ratio of the iron Fe to the metal Me in the laminatedly covered films is in the range of 0.1/1.0 to 10/1.0 so as to exhibit the effects. More preferably, it is 0.5/1.0 to 5.0/1.0 in the case of ferric ions and bivalent metal ions and 0.2/1.0 to 2.0/1.0 in the case of ferrous ions and tervalent metal ions. Further included is the range in which the iron and the metal are involved in the composition ratio of spinel ferrite. The films are formed by neutralizing these ions simultaneously in such ranges, exhibiting more significant effects, thus characterizing the present invention.

In the present invention, addition of Si, Al, B, P, etc. in any of the previous steps may improve further the effects of sintering prevention and morphological retention. The Si, Al, P, B, etc. used herein are in the form of water-soluble salts, colloidal hydroxides, metal alkoxides and chelated compounds.

The Si source may include colloidal silica, sodium metasilicate, sodium orthosilicate, water glass, methoxysilane, etc. The Al source may include the sulfate, nitrate, chloride and partial hydrolyzates thereof, aluminates such as colloidal alumina and sodium aluminate, alkoxides such as aluminum isopropoxide, chelated compounds such as aluminum trisacetylacetonate and complex salts thereof, etc. Included in the B source are boric acid, borates such as sodium borate, alkoxides such, as tetramethoxyborane, chelated compounds, etc. Among the P source are phosphoric acid, phosphates such as sodium hexametaphosphate, sodium tripolyphosphate, etc.

No particular restrictions are placed on the amount of Fe and Me in the laminatedly covered films relative to the amount of metallic components (primarily Fe) in the oxyhydroxide particles. It is possible to use Fe and Me in the range of 0.3 to 200%. Preferred Fe & Me range is 100 to 3%, approximately. Even in excess of 200%, the laminatedly covered films may be formed. However, 200% is considered to be a tentative standard in view of thickening of the particles and from operational and economical standpoints. Any amounts below 0.3% fail to exhibit the intended effects of the present invention.

In the present invention, the latter step of heating and reduction can also be carried out in the manner as disclosed in Japanese Patent Application Nos. 157214/1980 and 62915/1979. For example, the reduction can be achieved at a temperature in the range of 300° C. to 600° C. in an atmosphere of hydrogen or a reducing gas mainly comprising hydrogen. Optionally, the resulting reduced particles may be dehydrated or burned at a temperature in the range of 300° C. to 800° C.

The flow rate of the reducing hydrogen gas is such as to proceed the reducing reaction fast enough and hence may be about 3 $Nm^3/hr$ to 40 $Nm^3/hr$ per kg of the ferromagnetic metal particles.

The oxidizing treatment for preventing ignition may be carried out according to conventional procedures. It is also applicable to immerse the particles in an organic solvent such as toluene followed by drying, or to oxidize the particles slowly with diluted air.

The ferromagnetic metal particles obtained according to the present invention can be formed into high density magnetic recording media represented by magnetic tapes. The high density magnetic recording media are prepared, for example, by mixing the ferromagnetic metal particles with a binding resin component such as vinyl chloride resins, urethane resins and epoxy resins and a solvent component, dispersing highly the mixture thus formed using a dispersant and dispersing device to prepare a magnetic coating, applying the coating onto a base film by means of various coaters, and subjecting the resulting film to magnetic orientation and drying and then to surface finish by calendering.

EXAMPLES

The present invention will be described specifically with reference to the following examples. However, it is to be understood that the present invention is not limited thereto or thereby.

EXAMPLE 1

Particles of iron oxyhydroxide ($\alpha$-FeOOH) with a mean major axis length of 0.2 $\mu$m and an axis ratio of 12 were prepared. In a 50-1 vessel with jacket, 1.0 kg of said iron oxyhydroxide and 30 1 of pure water were fed, followed by stirring for 20 minutes with a homogenizer for dispersion.

Thereafter, a sodium hydroxide solution was added thereto to a pH of 13.6 and the resulting suspension was stirred for 30 minutes for dispersion.

Then, 723 g of ferric nitrate ($Fe(NO_3)_3 \cdot 9H_2O$) and 266 g of cobalt nitrate ($Co(NO_3)_2 \cdot 6H_2O$) were measured and dissolved together in 3 1 of pure water to prepare a mixed solution of $Fe^{3+}$ and $Co^{2+}$ (Fe/Co=2/1 by mole). Said mixed solution was added to the slurry solution having iron oxyhydroxide particles dispersed at a rate of 3 1/hr while stirring and mixing, and the resultant slurry solution was further stirred at 50° C. for 60 min. The slurry solution after the addition had a pH of 12.2.

Said slurry was filtered, and the solid was washed and dried to obtain particles, which were observed by means of TEM (transmission-type electron microscope). As a result of the observation, a microstructure formed as films were recognized on the whole surface of the iron oxyhydroxide particles.

The structure analysis of said particles by X-ray powder diffraction proved the presence of portions having a spinel structure of low crystallinity in addition to those with $\alpha$-FeOOH structure.

Separately, with a view to identifying the portions having a spinel structure of low crystallinity, ferric nitrate and cobalt nitrate were dissolved in pure water to prepare a mixed solution of $Fe^{3+}$ and $Co^{2+}$ (Fe/Co=2/1 by mole), which was then neutralized to obtain a gel formed. The gel was dried and then subjected to X-ray powder diffraction to obtain the spectrum given in FIG. 1, which was subjected to structure analysis. As a result, the product was found to be one having a spinel structure of low crystallinity. In other words, it was confirmed that the gel thus formed as a model had the identical structure with the laminatedly covered films on the oxyhydroxide particles formed by the simultaneous neutralization of iron and cobalt.

Figure 2:
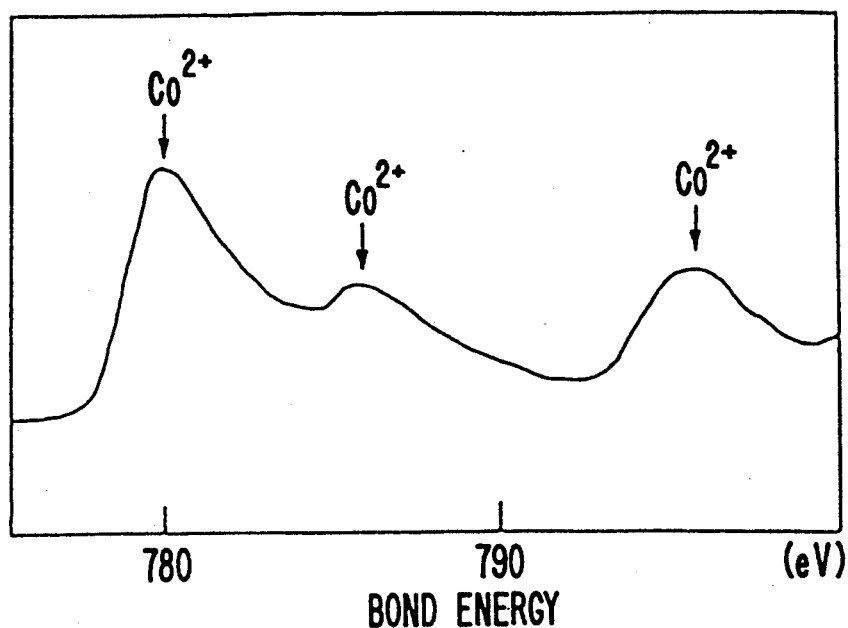
FIG. 2 is the bond energy constitutional spectrum of $Co^{2+}$ in the X-ray photoelectron spectroscopy of the surface of the laminatedly covered films on the surface of the oxyhydroxide particles, e.g., the surface of particles covered laminatedly by the coprecipitation of the particles of the oxyhydroxide mainly of iron and $Co^{2+}$ and $Fe^{3+}$.
Figure 3:
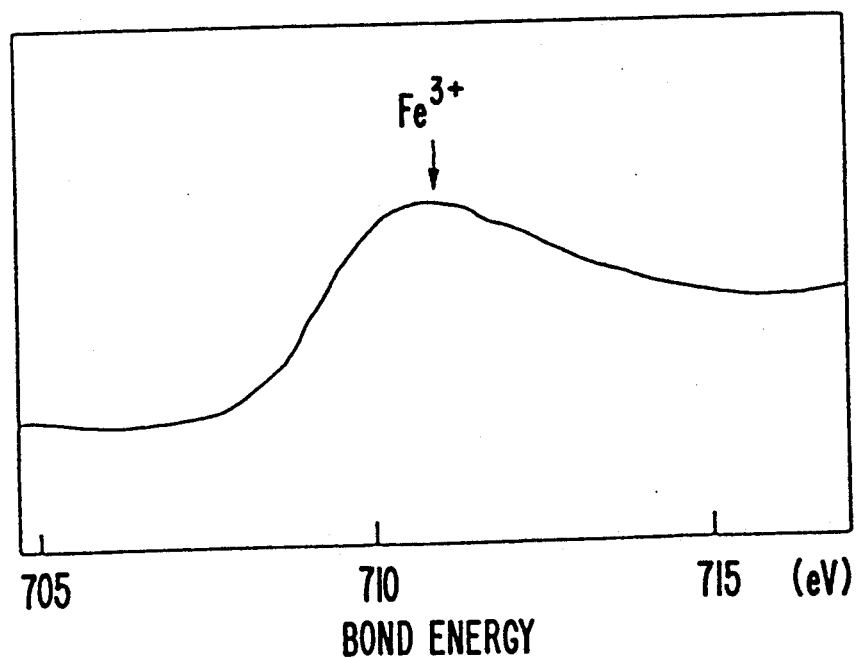
FIG. 3 is the bond energy constitutional spectrum of $Fe^{3+}$ in the XPS of the surface of the laminatedly covered films on the surface of the oxyhydroxide particles, e.g., the surface of particles covered laminatedly by the coprecipitation of the particles of the oxyhydroxide mainly of iron and $Co^{2+}$ and $Fe^{3+}$.

Further, said particles were analyzed by XPS with regard to the condition of elements on the surface thereof, with the result that $Fe^{3+}$ and $Co^{2+}$ were observed as shown in FIGS. 2 and 3 and the films were confirmed to be a complex oxide or hydroxide.

The particles were burned at 500° C. and then reduced at a temperature of 400° C. in a stream of hydrogen.

Subsequently, the reduced particles were immersed in toluene, dried at room temperature, and taken out in the air.

The measurement of the magnetic property revealed: Hc=1515 Oe, $\sigma s$=150 emu/g and R=0.52.

Further, the observation of the particles by a transmission-type electron microscope clarified that they were fine particles having films with an average major axis length of 0.18 $\mu$m.

A corrosion test at 60° C. and 90% RH (relative humidity) elucidated that $\sigma s$=138 emu/g after one week, indicating only 8% of reduction. From this fact, the particles are evaluated to have good corrosion resistance.

The ferromagnetic metal particles having excellent properties can be utilized as high density magnetic recording materials.

Figure 4:
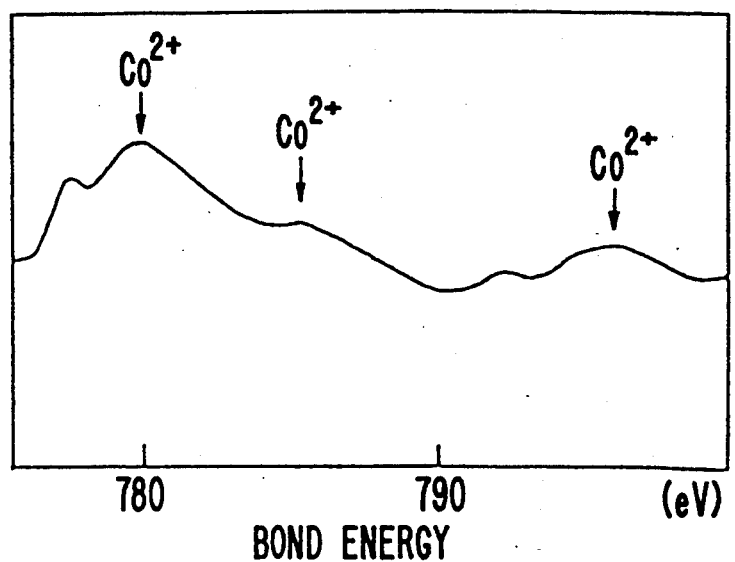
FIG. 4 is the bond energy constitutional spectrum of $Co^{2+}$ in the XPS of the surface section of the ferromagnetic metal particles having films covered laminatedly, which were obtained in Example 1.
Figure 5:
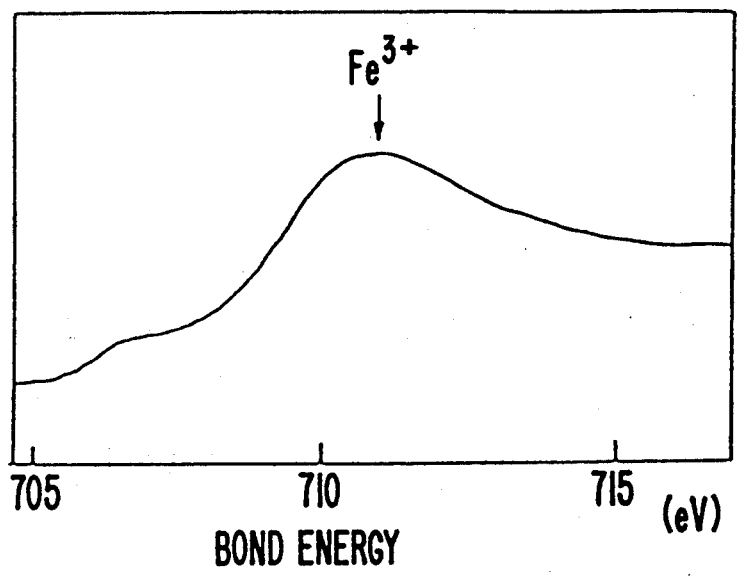
FIG. 5 is the bond energy constitutional spectrum of $Fe^{3+}$ in the XPS of the surface section of the ferromagnetic metal particles having films covered laminatedly, which were obtained in Example 1.

The analysis of the X-ray powder diffraction spectroscopy of said metal particles revealed the presence of the spectra of an oxide having a spinel structure of low crystallinity as well as $\alpha$-FeOOH. Further, when the condition of the surface elements was analyzed by XPS, $Co^{2+}$ and $Fe^{3+}$ were observed as shown in FIGS. 4 and 5 so that a complex oxide of iron and cobalt was confirmed in the film structure.

Said metal particles were observed by analytical electron microscopy to compare the amount of metal elements present in the surface section of the acicular particles with that in the interior thereof. It proved that cobalt element was present more in the surface section.

EXAMPLE 2

The same slurry as used in Example 1 was prepared.

Then, 723 g of ferric nitrate ($Fe(NO_3)_3.9H_2O$) and 272 g of zinc nitrate ($Zn(NO_3)_2.6H_2O$) were measured and dissolved together in 3 l of pure water to prepare a mixed solution of $Fe^{3+}$ and $Zn^{2+}$ (Fe/Zn=2/1 by mole). Said mixed solution was added to the slurry solution having iron oxyhydroxide particles dispersed under stirring and mixing at a rate of 3 l/hr. The stirring was continued at 50° C. for 60 minutes. The pH of the slurry solution after the addition was 12.2.

Said slurry was filtered, and the solid was washed and dried to obtain particles, which were observed by TEM. The observation clarified the presence of a microstructure formed as films in the surface section of the iron oxyhydroxide.

Figure 6:
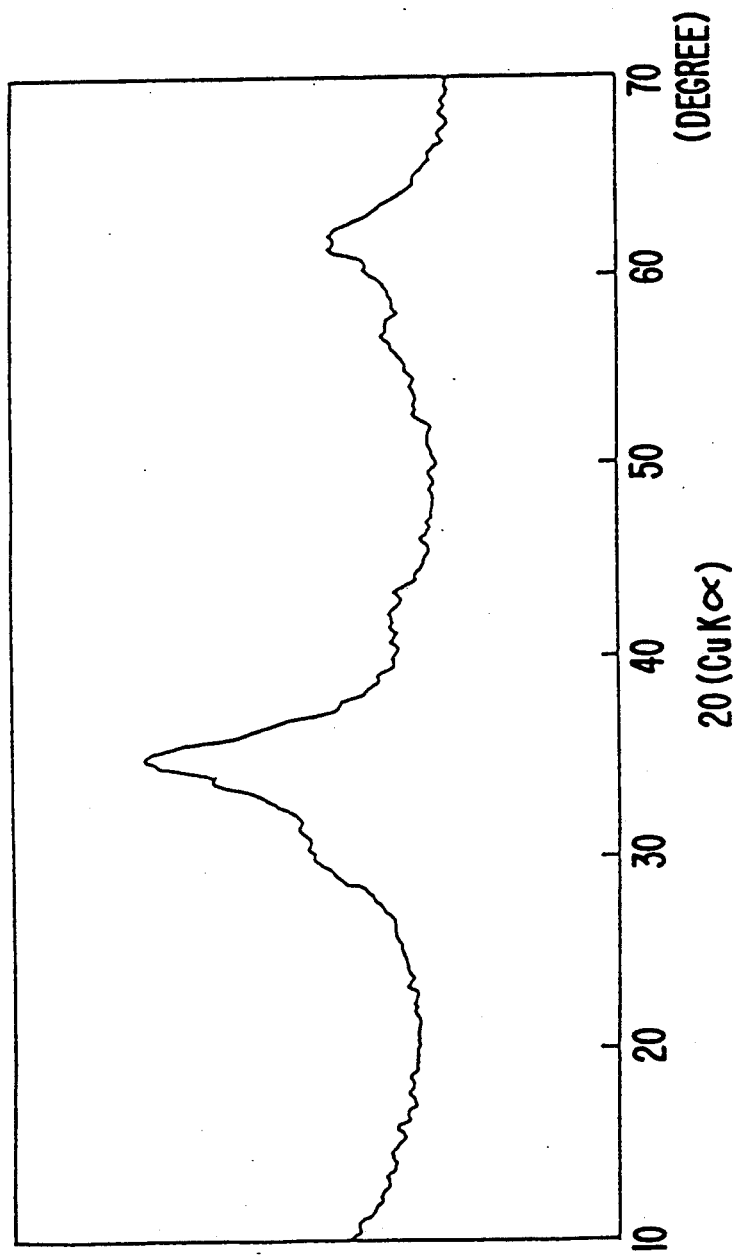
FIG. 6 is the X-ray powder diffraction spectrum of the insoluble matter (complex metal hydroxide) formed by neutralizing an aqueous mixed solution of ferric nitrate and zinc nitrate (Fe/Zn=2/1 by mole).

Further, the structure analysis of said particles by X-ray powder diffraction proved the presence of portions having a spinel structure of low crystallinity as well as the structure of $\alpha$-FeOOH, Separately, in order to identify the portions having a spinel structure of low crystalliity, ferric nitrate and zinc nitrate were dissolved in pure water to prepare a mixed solution of $Fe^{3+}$ and $Zn^{2+}$ (Fe/Zn=2/1 by mole), which was neutralized to form a gel. The gel was dried and subjected to X-ray powder diffracation to obtain a spectrum shown in FIG. 6, which was analyzed structurally. As a result, the gel was found to be a compound having a spinel structure of low crystallinity. In other words, it was confirmed that the gel thus formed as a model had the identical structure with the films covered laminatedly on the oxyhydroxide particles by the simultaneous neutralization of iron and zinc.

Figure 7:
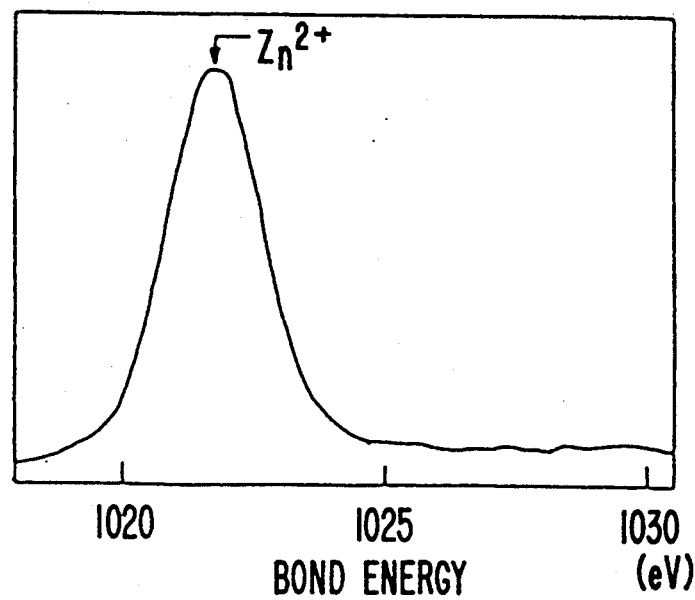
FIG. 7 is the bond energy constitutional spectrum of $Zn^{2+}$ in the X-ray photoelectron spectroscopy of the surface of the films covering laminatedly the surface of the oxyhydroxide particles, e.g., the surface of particles covered laminatedly by the coprecipitation of the particles of the oxyhydroxide mainly of iron and $Zn^{2+}$ and $Fe^{3+}$.
Figure 8:
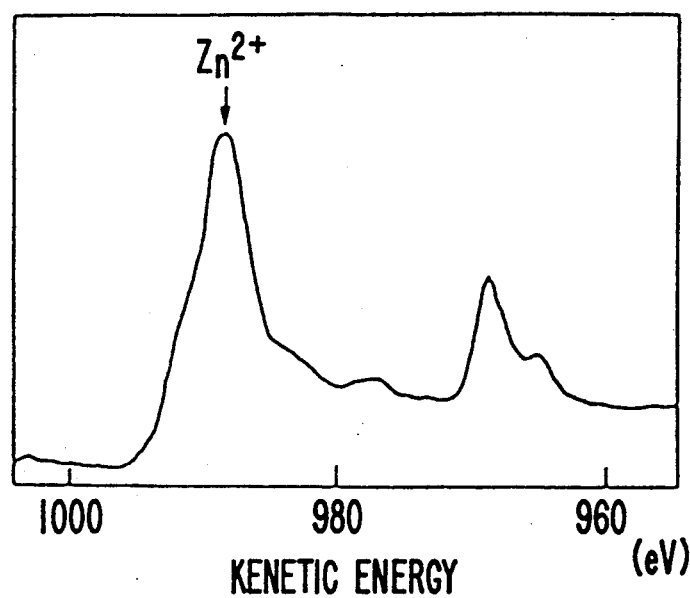
FIG. 8 is the kinetic energy constitutional spectrum of $Zn^{2+}$ in the XPS of the surface of the films covering laminatedly the surface of the oxyhydroxide particles, e.g., the surface of particles covered laminatedly by the coprecipitation of the particles of the oxyhydroxide mainly of iron and $Zn^{2+}$ and $Fe^{3+}$.
Figure 9:
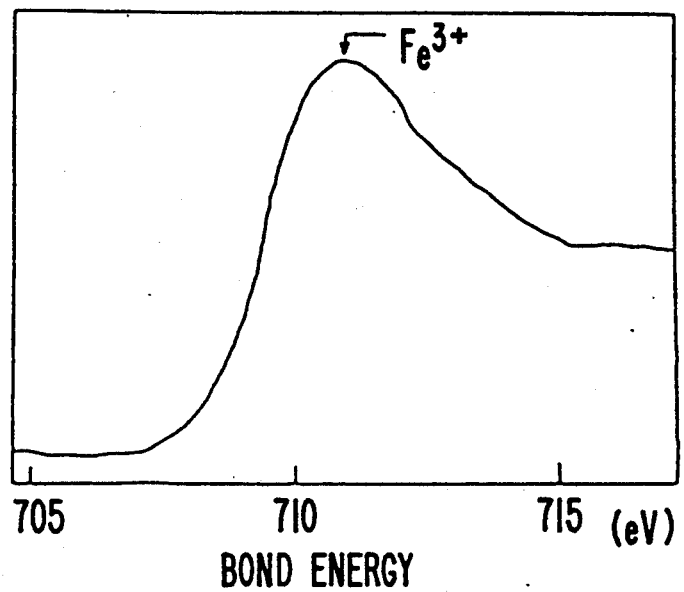
FIG. 9 is the bond energy constitutional spectrum of $Fe^{3+}$ in the XPS of the surface of the films covering laminatedly the surface of the oxyhydroxide particles, e.g., the surface of particles covered laminatedly by the coprecipitation of the particles of the oxyhydroxide mainly of iron and $Zn^{2+}$ and $Fe^{3+}$.

Further, the constitutional analysis of elements on the surface of said particles by XPS proved the presence of $Zn^{2+}$ and $Fe^{3+}$ as shown in FIGS. 7, 8 and 9 so that the films were identified to be a complex oxide or hydroxide.

The particles were burned at 500° C. and reduced at a temperature of 400° C. in a stream of hydrogen.

Subsequently, the reduced particles were dipped in toluene, dried at room temperature, and taken out in the air.

The measurement of the magnetic property revealed; Hc=1530 Oe $\sigma s$=145 emu/g and R=0.52.

Further, the observation of the particles with a transmission-type electron microscope clarified that they were fine particles having films with an average major axis length of 0.18 μm.

A corrosion test at 60° C. and 90% RH (relative humidity) elucidated that $\sigma s$=133 emu/g after one week, indicating only 8% of reduction. From this fact, it is evaluated that the particles have good corrosion resistance.

The ferromagnetic metal particles having excellent properties can be utilized as high density magnetic recording materials.

The observation of said metal particle powder by X-ray powder diffraction clarified the presence of an oxide having a spinel structure of low crystallinity in addition to $\alpha$-FeOOH.

Figure 10:
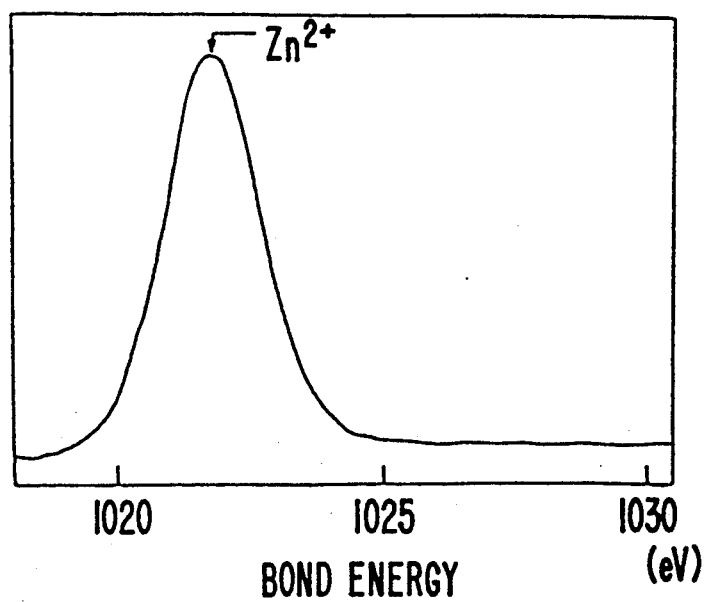
FIG. 10 is the bond energy constitutional spectrum of $Zn^{2+}$ in the XPS of the surface section of the ferromagnetic metal particles having films covered laminatedly, which were obtained in Example 2.
Figure 11:
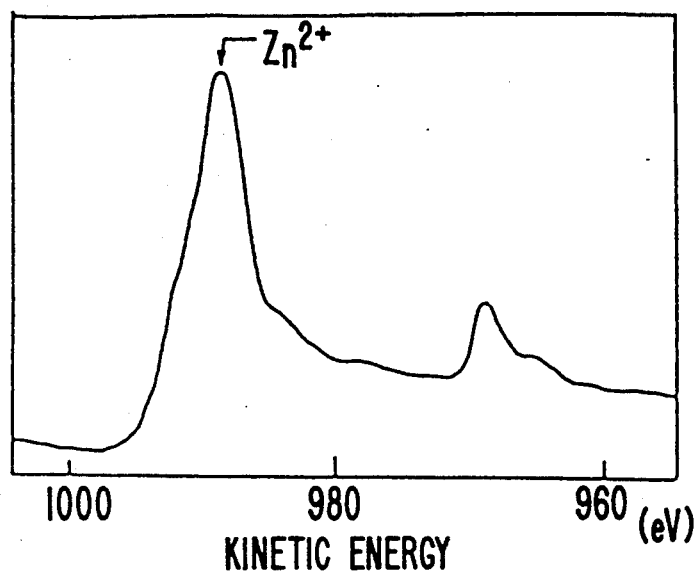
FIG. 11 is the kinetic energy constitutional spectrum of $Zn^{2+}$ in the XPS of the surface section of the ferromagnetic metal particles having films covered laminatedly, which were obtained in Example 2.
Figure 12:
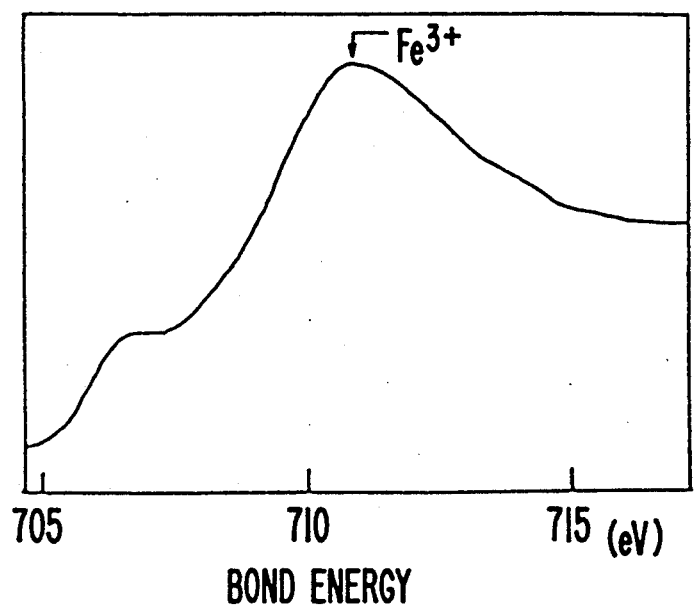
FIG. 12 is the bond energy constitutional spectrum of $Fe^{3+}$ in the XPS of the surface section of the ferromagnetic metal particles having films covered laminatedly, which were obtained in Example 2.

Further, when the condition of the surface elements was analyzed by XPS, $Zn^{2+}$ and $Fe^{3+}$ were observed as shown in FIGS. 10, 11 and 12 so that a complex compound of iron and zinc was recognized in the film structure.

Said metal particles were observed by analytical electron microscopy to compare the amount of metal elements present in the surface section of the acicular particles with that in the interior thereof. It proved that zinc element was present more in the surface section.

COMPARATIVE EXAMPLE 1

(In this example, the particles were prepared in the same manner as in Example 1 except that ferric nitrate was not used.) Iron oxyhydroxide of Example 1 was used. In the same manner as in Example 1, the oxyhydroxide slurry was added with sodium hydroxide and dispersed by stirring. Then, a solution having 266 g of cobalt nitrate alone dissolved was added thereto for neutralization, followed by mixing under stirring. In the same manner as in Example 1, the slurry was filtered, and the solid was washed and dried to obtain particles, the films of which were investigated by TEM observation.

As a result of the observation, a number of hexagonal plate particles were found as well as the acicular particles of iron oxyhydroxide, and no films were observed on the surface of the iron oxyhydroxide.

The hexagonal plate particles were measured by X-ray powder diffraction and electron beam diffraction and identified as $\beta$-$Co(OH)_2$. The product formed by the neutralization reaction was independent particles of cobalt hydroxide.

In the same manner as in Example 1, the particles were heated and reduced to prepare ferromagnetic particles, which were then treated following the procedure of Example 1. Investigations were made with regard to TEM, magnetic property and weather resistance. As a result, granular particles were recognized besides the acicular particles, giving Hc=980 Oe, $\sigma s$=135 emu/g and R=0.45.

Further, $\sigma s$=96 emu/g after deterioration and hence the particles were inadequate as a high density magnetic recording material.

The granular particles were analyzed by analytical electron microscopy to identify their metal elements, with the result that they were found to be particles formed substantially of cobalt.

From the foregoing results, it was found that the particles prepared by neutralizing cobalt alone with the oxyhydroxide particles are ferromagnetic metal particles having neither the spinel structure of iron and cobalt as the precipitate nor laminatedly covered films that have a spinel structure.

COMPARATIVE EXAMPLE 2

(In this example, the particles were prepared in the same manner as in Example 1 except that ferrous ions and cobalt bivalent ions were neutralized and co-precipitated.)

Iron oxyhydroxide of Example 1 was employed. In the same manner as in Example 1, the oxyhydroxide slurry was added with sodium hydroxide and dispersed by stirring. Thereafter, a solution having 508 g of ferrous sulfate ($FeSO_4.7H_2O$) and 257 g of cobalt sulfate ($CoSO_4.7H_2O$) dissolved (Fe/Co=2/1 by mole) was added thereto and the resulting slurry was stirred for mixing. The pH of the resulting slurry solution was 12.7.

Then, air was introduced at a rate of 1 l/min to continue oxidation for 3 hours while mixing. The temperature of the oxidation was 50° C.

Said slurry was filtered, and the solid was washed and dried to obtain particles, which were observed by means of TEM. The observation clarified that cubic particles having approximately the same length (0.2 μm) as that of the iron oxyhydroxide particles were scattered within the field of vision.

The cubic particles were measured and analyzed by electron beam diffraction and analytical electron microscopy, and they were identified as cobalt ferrite.

From these results, it was elucidated that in the system of $Fe^{2+}$ and $Co^{2+}$, these elements were present as spinel-type ferrite particles independently and did not form films on the surface of the iron oxyhydroxide particles.

In the same manner as in Example 1, the particles were heated and reduced to prepare ferromagnetic metal particles, which were then treated in the same manner as in Example 1. The particles thus obtained were investigated with regard to TEM, magnetic property and weather resistance. In consequence, granular particles were observed in addition to acicular particles, and Hc=950 Oe, $\sigma s$=140 emu/g and R=0.43.

Further, $\sigma s$=95 emu/g after deterioration, and hence the particles were inappropriate as metal particles for high density magnetic recording. As a result of the metal element analysis of the granular particles by analytical electron microscopy, a large amount of Co was detected, indicating that the spinel ferrite particles were reduced in their original form.

Substantially no Co was detected in the acicular particles.

COMPARATIVE EXAMPLE 3

(In this case, only zinc was used following the procedure of Example 1.)

Iron oxyhydroxide of Example 1 was used. In the same manner as in Example 1, the oxyhydroxide slurry was added with sodium hydroxide and dispersed by stirring. Afterward, a solution having 272 g of zinc nitrate alone dissolved was added thereto and mixed by stirring. The slurry was filtered, and the solid was washed and dried to obtain particles, the films of which were studied by TEM observation in the same manner as in Example 1.

As a result of the observation, a number of plate particles were recognized in addition to the acicular particles of iron oxyhydroxide, and no films were observed on the surface of the iron oxyhydroxide.

Zn was detected as a result of the measurement of the plate particles by analytical electron microscopy. It was confirmed that the product of the neutralization reaction was independent particles of zinc hydroxide, which were not covered on the acicular particles of iron oxyhydroxide.

The particles obtained were heated and reduced in the same manner as in Example 1 to prepare ferromagnetic metal particles, which were then treated in the same manner as in Example 1. The resulting particles were studied with regard to TEM, magnetic property and weather resistance.

As a result, it was observed that the particles comprised granular particles as well as acicular particles, giving Hc=1050 Oe, $\sigma s$=130 emu/g and R=0.48.

Further, $\sigma s$=95 emu/g after a corrosion test, indicating that the particles were inadequate as high density magnetic recording materials.

The analysis of metallic elements in the granular particles revealed that the particles were identified as those substantially of zinc.

From the foregoing results, it was found that the particles prepared by neutralizing zinc alone with the oxyhydroxide particles are ferromagnetic metal particles having neither the spinel structure of iron and zinc as the precipitate nor laminatedly covered films that have a spinel structure.

COMPARATIVE EXAMPLE 4

(In this example, only nickel was used following the procedure of Example 1.)

Iron oxyhydroxide of Example 1 was used. In the same manner as in Example 1, the oxyhydroxide slurry was added with sodium hydroxide and dispersed by stirring. Thereafter, a solution having 260 g of nickel nitrate alone dissolved was added thereto and mixed by stirring. The slurry was filtered, and the solid was washed and dried to obtain particles, the films of which were studied by TEM observation in the same manner as in Example 1.

The observation clarified that a number of minute particles were present in addition to the acicular particles of iron oxyhydroxide and no films were seen on the surface of the iron oxyhydroxide.

As a result of the identification of said minute particles by X-ray powder diffraction and electron beam diffraction, they were found to be $Ni(OH)_2$. Thus, the product of the neutralization reaction was independent particles of nickel hydroxide.

The particles obtained was heated and reduced in the same manner as in Example 1 to produce ferromagnetic metal particles, which were then treated in the same manner as in Example 1. The resulting particles were investigated with regard to TEM, magnetic property and weather resistance. As a result, it was found that the particles comprised granular particles as well as acicular particles, giving Hc=830 Oe, $\sigma s$=125 emu/g and R=0.44.

Further, $\sigma s$=89 emu/g after a corrosion test, indicating that the particles were inadequate as a high density magnetic recording material.

The analysis of the metallic element of the granular particles by analytical electron microscopy identified the element to be nickel alone.

From the foregoing results, it was found that the particles prepared by neutralizing nickel alone with the oxyhydroxide particles are ferromagnetic metal particles having neither the spinel structure of iron and nickel as the precipitate nor laminatedly covered films that have a spinel structure.

COMPARATIVE EXAMPLE 5

(In this example, bivalent ions of both ferrous iron and zinc are used following the procedure of Example 1.)

Iron oxyhydroxide of Example 1 were used. In the same manner as in Example 1, the oxyhydroxide slurry was added with sodium hydroxide and dispersed by stirring. Thereafter, a mixed solution having 508 g of ferrous sulfate ($FeSO_4 \cdot 7H_2O$) and 263 g of zinc sulfate ($ZnSO_4 \cdot 7H_2O$) dissolved (Fe/Co=2/1 by mole) was added thereto under stirring for neutralization. The resulting slurry solution had a pH of 12.7.

Then, air was introduced at a rate of 1 l/min to continue oxidation reaction for 3 hours. The temperature of the oxidation reaction was 50° C.

Said slurry was filtered, and the solid was washed and dried to obtain particles, which were observed by TEM. The observation clarified that cubic particles of nearly the same length (0.2 μm) as that of the iron oxyhydroxide particles were scattered in the field of vision.

The cubic particles were measured and analyzed by electron beam diffraction and analytical electron microscopy to identify them as those of zinc ferrite. These results revealed that in the system of $Fe^{2+}$ and $Zn^{2+}$, spinel-type ferrite particles were scattered independently and did not form films on the surface of the iron oxyhydroxide particles.

In the same manner as in Example 1, the particles obtained were heated and reduced to produce ferromagnetic metal particles, which were then treated in the same manner as in Example 1. The resulting particles were measured with respect to TEM, magnetic property and weather resistance. As a result, it was observed that the particles comprised granular particles as well as acicular particles, giving Hc=960 Oe, $\sigma s$=130 emu/g and R=0.45.

Further, $\sigma s$=95 emu/g after corrosion test, indicating that the particles were inadequate as metal particles for high density magnetic recording. As a result of the elementary analysis of the metals in the granular particles by analytical electron microscopy, a large amount of Zn was detected. This means that the spinel ferrite particles were reduced in their original form. Substantially no Zn was observed in the acicular particles.

EXAMPLES 3-7

The neutralization and coprecipitation were carried out with iron oxyhydroxide particles in the same manner as in Example 1, except for the respective use of manganese nitrate and ferric nitrate, aluminum nitrate and ferrous nitrate, chromium nitrate and ferrous nitrate, nickel nitrate and ferric nitrate, and copper nitrate and ferric nitrate.

The resulting particles were measured by means of TEM, X-ray powder diffraction and XPS. From the results, it was confirmed that the particles were iron oxyhydroxide particles having films of ferrite compounds with spinel structures on the surfaces thereof.

In the same manner as in Example 1, the particles were heated and reduced to obtain ferromagnetic metal particles.

The ferromagnetic metal particles were treated in the same manner as in Example 1 to obtain particles, which were measured in regard to TEM, magnetic property, weathering test, X-ray powder diffraction and XPS The principal results are shown in Table 1.

As a result of the TEM, magnetic property and weathering tests, it was confirmed that the particles were ferromagnetic metal particles suitable characteristically for use as magnetic powder for high density magnetic recording.

Further, the powder X-ray diffraction and XPS proved that the particles had films of ferrite compounds having the respective spinel structures of manganese and iron, aluminum and iron, chromium and iron, nickel and iron, and copper and iron.

EXAMPLES 8-10

Films were covered laminatedly on iron oxyhydroxide particles by the neutralization and coprecipitation in the same manner as in Example 1, except that nickel nitrate, cobalt nitrate and ferric nitrate, zinc nitrate, cobalt nitrate and ferric nitrate, and nickel nitrate, zinc nitrate and ferric nitrate were used, respectively.

The resulting particles were measured by means of TEM, X-ray powder diffraction and XPS. The results proved that the particles were iron oxyhydroxide particles having films of ferrite compounds with spinel structures on the surfaces thereof.

The particles were heated and reduced in the same manner as in Example 1 to obtain powdery ferromagnetic metal particles.

The powdery particles were then treated in the same manner as in Example 1. The resulting particles were subjected to the measurements of TEM, magnetic property, weathering test, X-ray powder diffraction and XPS. The principal results are shown in Table 2.

TABLE 1

| | Conditions of laminatedly covering | | Properties of ferromagnetic metal particles | | | | |
|---|---|---|---|---|---|---|---|
| | Metallic ions of coprecipitation/ laminatedly covering | Atomic ratio | Hc (Oe) | $\sigma s$ (emu/g) | R (—) | $\sigma s^*$ (emu/g) | Particle length (μm) |
| Example | | | | | | | |
| 1 | ferric iron, bivalent Co | 2:1 | 1515 | 150 | 0.52 | 138 | 0.18 |
| 2 | ferric iron, bivalent Zn | 2:1 | 1530 | 145 | 0.52 | 133 | 0.18 |
| 3 | ferric iron, bivalent Mn | 2:1 | 1510 | 140 | 0.52 | 128 | 0.17 |
| 4 | ferrous iron, tervalent Al | 1:2 | 1450 | 143 | 0.51 | 132 | 0.15 |
| 5 | ferrous iron, tervalent Cr | 1:2 | 1460 | 142 | 0.51 | 130 | 0.16 |
| 6 | ferric iron, bivalent Ni | 2:1 | 1480 | 145 | 0.50 | 133 | 0.18 |
| 7 | ferric iron, bivalent Cu | 2:1 | 1400 | 148 | 0.51 | 128 | 0.20 |
| Comp. Ex. | | | | | | | |
| 1 | bivalent Co | — | 980 | 135 | 0.45 | 96 | 0.28 |
| 2 | ferrous iron, bivalent Co | — | 950 | 140 | 0.43 | 95 | 0.31 |
| 3 | bivalent Zn | — | 1050 | 130 | 0.48 | 95 | 0.29 |
| 4 | bivalent Ni | — | 830 | 125 | 0.55 | 89 | 0.30 |
| 5 | ferrous iron, bivalent Zn | — | 960 | 130 | 0.45 | 95 | 0.35 |

$\sigma s^*$ means saturation magnetization after one week shelf test at 60° C. and 90% R.H.

TABLE 2

| Example | Conditions of coprecipitation/laminatedly covering | | Properties of Ferromagnetic metal particles | | | | |
|---|---|---|---|---|---|---|---|
| | Atomic ratio of Fe to metals | Amount of Fe Fe/Fe (FeOOH) | Hc (Oe) | $\sigma s$ (emu/g) | R (—) | $\sigma s^*$ | Particle length ($\mu m$) |
| 8 | Fe:Co:Ni 4:1:1 | 32% | 1540 | 145 | 0.53 | 130 | 0.16 |
| 9 | Fe:Co:Zn 4:1:1 | 32% | 1615 | 154 | 0.53 | 142 | 0.17 |
| 10 | Fe:Ni:Zn 4:1:1 | 32% | 1470 | 140 | 0.52 | 125 | 0.17 |

$\sigma s^*$ means saturation magnetization after one week shelf test at 60° C. and 90% R.H.

As a result of the TEM, magnetic property and weathering tests, it was confirmed that the particles were ferromagnetic metal particles having characteristics suitable for use as magnetic powders for high density recording.

The results of the x-ray powder diffraction and XPS proved that the particles had films of ferrite compounds of the spinel structures of nickel, cobalt and iron, zinc, cobalt and iron, and nickel, zinc and iron, respectively. Thus, it was found that the formation of such films on the surface enabled the ferromagnetic metal particles to have characteristics excellent in the morphology of particles, magnetic property and weather resistance.

EXAMPLE 11

The iron oxyhydroxide particles having the ferrite films of cobalt and iron on the surface, obtained in Example 1, were dispersed in pure water, to which colloidal $SiO_2$ (Snowtex O: a product of Nissan Chemical Industries, Ltd.) was added in 2% based on the iron oxyhydroxide to allow the particles to adsorb it onto the surface.

Said iron oxyhydroxide particles were dried, and heated and reduced in the same manner as in Example 1 to obtain ferromagnetic metal particles. The particles thus obtained were treated in the same manner as in Example 1. The resulting particles were measured with respect to TEM, magnetic property, weathering test, X-ray powder diffraction and XPS. The results of the TEM, magnetic property and weathering test are shown in Table 3. The particles were found to have a further increased coersive force, indicating that they were ferromagnetic metal particles suitable for high density magnetic recording materials.

The results of the X-ray powder diffraction and XPS clarified that they were ferromagnetic metal particles having films of a spinel structure of iron and cobalt. From the foregoings, it was found that the particles containing Si also gave the intended effects more satisfactorily.

EXAMPLE 12

The iron oxyhydroxide particles having the ferrite films of zinc and iron on the surface, obtained in Example 2, were dispersed in pure water, to which colloidal $SiO_2$ (Snowtex O: a product of Nissan Chemical industries, ltd.) was added in 2% based on the iron oxyhydroxide to allow the particles to adsorb it onto the surface.

Said iron oxyhydroxide particles were dried, and heated and reduced in the same manner as in Example 1 to obtain ferromagnetic metal particles. The particles thus obtained were treated in the same manner as in Example 1. The resulting particles were measured with respect to TEM, magnetic property, weathering test, X-ray powder diffraction and XPS. The results of the TEM, magnetic property and weathering test are shown in Table 3. The particles were found to have a further improved coersive force, indicating that they were ferromagnetic metal particles suitable for high density magnetic recording materials.

The results of the X-ray powder diffraction and XPS clarified that they were ferromagnetic metal particles having films of a spinel structure of iron and zinc. From the results, it was found that the particles containing Si also gave the intended effects more satisfactorily.

EXAMPLES 13-18

The respective iron oxyhydroxide particles obtained in Examples 1 and 2, which have the ferrite films of cobalt and iron and zinc and iron, correspondingly, were dispersed in pure water. Following the procedures of Examples 11 and 12, the respective oxyhydroxide particles were allowed to adsorb an Al, Pb or B compound in place of the Si compound. Sodium aluminate, phosphoric acid and boric acid were used as the Al, P and B compounds, respectively.

After the filtration, washing and drying, the particles were heated and reduced in the same manner as in Example 1 to obtain powdery ferromagnetic metal particles. The powdery particles were treated in the same manner as in Example 1. The resulting particles were measured with respect to TEM, magnetic property, weathering test, X-ray powder diffraction and XPS.

The principal results obtained are shown in Table 3, indicating that all the particles were materials suitable as high density magnetic recording metal particles.

They were also powdery ferromagnetic metal particles having ferrite films with the spinel structure of iron and cobalt. The results revealed that the particles containing Al, P and B also had better properties.

COMPARATIVE EXAMPLE 6

(In this case, Si alone was adsorbed to iron oxyhydroxide particles in Example 11.)

Iron oxyhydroxide of Example 1 was used. The oxyhydroxide particles without ferrite films of spinel structure were allowed to adsorb colloidal $SiO_2$ in the same manner as in Example 11.

The particles thus obtained were heated and reduced in the same manner as in Example 1 to obtain powdery ferromagnetic metal particles, which were then treated in the same manner as in Example 1. The resulting particles were subjected to TEM, magnetic property and weathering tests. The principal results are shown in Table 3.

The particles showed good morphological retention by TEM and good magnetic property. However, the particles deteriorated seriously in the weathering test, proving that they were unsuitable for practical use as magnetic particles for high density magnetic recording.

Thus, it was found that the ferromagnetic metal particles without ferrite films of the spinel structure comprising iron and a specific metal such as cobalt could not give the intended effects.

Further, the results of the X-ray powder diffraction and XPS clarified that the ferromagnetic metal particles had ferrite films of spinel structure on the surface. From these results, the iron oxyhydroxide particles containing

TABLE 3

| | Iron oxyhydroxide | Additive | Amount added Me/Fe (%) | Properties of ferromagnetic metal particles | | | |
|---|---|---|---|---|---|---|---|
| | | | | Hc (Oe) | σs (emu/g) | R (—) | σs* (emu/g) |
| Example | | | | | | | |
| 11 | coprecipitated/laminatedly covered particles in Ex. 1 | Colloidal SiO$_2$ | 2 | 1695 | 140 | 0.54 | 125 |
| 12 | coprecipitated/laminatedly covered particles in Ex. 2 | Colloidal SiO$_2$ | 2 | 1680 | 133 | 0.54 | 120 |
| 13 | coprecipitated/laminatedly covered particles in Ex. 1 | Sodium aluminate | 2 | 1630 | 145 | 0.53 | 130 |
| 14 | coprecipitated/laminatedly covered particles in Ex. 2 | Sodium aluminate | 2 | 1680 | 145 | 0.54 | 132 |
| 15 | coprecipitated/laminatedly covered particles in Ex. 1 | Phosphoric acid | 2 | 1580 | 142 | 0.53 | 127 |
| 16 | coprecipitated/laminatedly covered particles in Ex. 2 | Phosphoric acid | 2 | 1590 | 136 | 0.53 | 120 |
| 17 | coprecipitated/laminatedly covered particles in Ex. 1 | boric acid | 1.5 | 1615 | 142 | 0.53 | 128 |
| 18 | coprecipitated/laminatedly covered particles in Ex. 2 | boric acid SiO$_2$ | 1.5 | 1605 | 137 | 0.53 | 122 |
| Comp. Ex. 6 | α-FeOOH used in Ex. 1 | Colloidal | 2 | 1450 | 120 | 0.51 | 88 |

σs* means saturation magnetization after one week shelf test at 60° C. and 90% R.H.

EXAMPLE 19

Iron oxyhydroxide particles of an average major axis length of 0.25 μm and an axis ratio of 15, which have 1% of Ni coprecipitated relative to Fe, were covered laminatedly with coprecipitated iron and cobalt in the same manner as in Example 1. The resulting particles were measured with regard to TEM, X-ray powder diffraction and XPS. The analysis of these results revealed that the particles were iron oxyhydroxide particles having ferrite films of spinel structure on the surface.

The particles obtained were heated and reduced in the same manner as in Example 1 to obtain ferromagnetic metal particles, which were measured with respect to TEM, X-ray powder diffraction and XPS. The principal results are shown in Table 4.

Further, the results of the X-ray powder diffraction and XPS clarified that the ferromagnetic particles had ferrite films of spinel structure on the surface thereof.

From these results, the iron oxyhydroxide particles containing coprecipitated Ni were found to give the intended effects of the present invention.

EXAMPLE 20

Iron oxyhydroxide particles (α-FeOOH) of an average major axis length of 0.25 μm and an axis ratio of 15, which had 1% of Al coprecipitated relative to Fe, were used as a starting material.

Said iron oxyhydroxide particles were covered laminatedly with coprecipitated iron and nickel in the same manner as in Example 1. The resulting particles were measured with regard to TEM, X-ray powder diffraction and XPS. The analysis of the results proved that said particles had ferrite films of spinel structure on the surface thereof.

The particles were heated and reduced in the same manner as in Example 1 to obtain ferromagnetic metal particles, which were measured with respect to TEM, X-ray powder diffraction and XPS. The principal results are shown in Table 4.

coprecipitated Al were found to give the intended effects of the present invention.

EXAMPLE 21

Iron oxyhydroxide particles of the γ-type (γ-FeOOH) having an average particle length of 0.27 μm and an axis ratio of 15 were used as a raw material.

The α-FeOOH was covered laminatedly with coprecipitated iron and cobalt in the same manner as in Example 1. The particles thus obtained were measured with respect to TEM, X-ray powder diffraction and XPS. The analysis of the results proved that the γ-FeOOH had ferrite films of spinel structure on the surface thereof.

In the same manner as in Example 1, the particles were converted to ferromagnetic metal particles, which were measured with respect to various properties. The principal results are given in Table 4.

Further, the results of X-ray powder diffraction and XPS proved that the particles had ferrite films of spinel structure on the surface. The variation of the kind of the oxyhydroxide still proved to give the intended effects of the present invention.

EXAMPLE 22

γ-FeOOH of an average particle length of 0.27 μm and an axis ratio of 10 was used as a raw material.

The γ-FeOOH was covered laminatedly with coprecipitated iron and nickel in the same manner as in Example 1. Said particles were measured with regard to TEM, X-ray powder diffraction and XPS. The analysis of the results proved that the γ-FeOOH had ferrite films of spinel structure on the surface.

In the same manner as in Example 1, the particles were transformed to ferromagnetic metal particles, which were measured with respect to various properties. The principal results are shown in Table 4.

The results of X-ray powder diffraction and XPS proved that the particles had ferrite films of spinel structure on the surface. The variation of the kind of the oxyhydroxide still proved to give the intended effects of the present invention.

EXAMPLES 23-26

Ferromagnetic metal particles were prepared in the same manner as in Example 1 except that the conditions of the coprecipitation and laminatedly covering were changed by using iron and cobalt. The principal conditions are as given in Table 5.

In all of the examples, the particles were measured as regards TEM, X-ray powder diffraction and XPS. As a result, ferrite films of spinel structures were recognized.

Ferromagnetic metal particles were obtained in the same manner as in Example 1. The results obtained are shown in Table 5. As the amount of the coprecipitated and laminatedly-covered metals is decreased, so the effects are exhibited to a lesser extent. In all of the examples, it was found that the particles had the ferrite films of spinel structures formed on the surfaces thereof and the presence of the films contributed to exhibiting the effects.

EXAMPLES 27-30

Ferromagnetic metal particles were prepared in the same manner as in Example 6 except that the conditions of the coprecipitation and laminatedly covering were changed by using iron and nickel. The principal conditions are as given in Table 6.

In all of the examples, the particles were measured as regards TEM, X-ray powder diffraction and XPS. As a result, ferrite films of spinel structures were recognized.

Further, ferromagnetic metal particles were obtained in the same manner as in Example 6. The results obtained are shown in Table 6. As the amount of the coprecipitated and laminatedly-covered metals is decreased, so the effects are exhibited to a lesser extent. It was found that the particles had the ferrite films of spinel structures formed on the surfaces thereof and the presence of the films contributed to exhibiting the effect of corrosion resistance.

Further, the examples also showed such effects that Ni caused the reduction to proceed quickly or increased Ni amounts allowed the coersive force to be regulated.

TABLE 4

| Example | Starting oxyhydroxide particles | Properties of ferromagnetic metal particles | | | | |
|---|---|---|---|---|---|---|
| | | Hc (Oe) | $\sigma s$ (emu/g) | R (—) | $\sigma s^*$ (emu/g) | Particle length (μm) |
| 19 | α-FeOOH with Ni coprecipitated | 1620 | 146 | 0.54 | 133 | 0.22 |
| 20 | α-FeOOH with Al coprecipitated | 1450 | 145 | 0.51 | 133 | 0.22 |
| 21 | γ-FeOOH with Co/Fe laminatedly covered | 1430 | 155 | 0.52 | 137 | 0.25 |
| 22 | γ-FeOOH with Ni/Fe laminatedly covered | 1410 | 147 | 0.51 | 134 | 0.25 |

$\sigma s^*$ means saturation magnetization after one week shelf test at 60° C. and 90% R.H.

TABLE 5

| Example | Conditions of coprecipitation/ laminatedly covering | | Properties of ferromagnetic metal particles | | | |
|---|---|---|---|---|---|---|
| | Fe:Co Atomic ratio | Amount of Fe (%) Fe/Fe (FeOOH) | Hc (Oe) | $\sigma s$ (emu/g) | R (—) | $\sigma s^*$ (emu/g) |
| 23 | 1:1 | 16 | 1550 | 153 | 0.52 | 137 |
| 24 | 3:1 | 16 | 1470 | 148 | 0.51 | 128 |
| 25 | 2:1 | 50 | 1680 | 158 | 0.53 | 139 |
| 26 | 2:1 | 100 | 1810 | 165 | 0.55 | 144 |

$\sigma s^*$ means magnetic saturation after one week shelf test at 60° C. and 90% R.H.

TABLE 6

| Example | Conditions of coprecipitation/ laminatedly covering | | Properties of ferromagnetic metal particles | | | |
|---|---|---|---|---|---|---|
| | Fe:Ni Atomic ratio | Amount of Fe (%) Fe/Fe (FeOOH) | Hc (Oe) | $\sigma s$ (emu/g) | R (—) | $\sigma s^*$ (emu/g) |
| 27 | 1:1 | 16 | 1405 | 138 | 0.52 | 130 |
| 28 | 3:1 | 16 | 1525 | 145 | 0.50 | 123 |
| 29 | 2:1 | 50 | 1310 | 131 | 0.52 | 126 |
| 30 | 2:1 | 100 | 1180 | 128 | 0.53 | 125 |

$\sigma s^*$ means saturation magnetization after one week shelf test at 60° C. and 90% R.H.

We claim:

1. Ferromagnetic metal particles comprising a coating of a ferrite compound having a spinel structure composed of iron and at least one metal selected from cobalt, zinc, manganese, aluminum, chromium, nickel and copper having a different valency than the iron.

2. Ferromagnetic metal particles as claimed in claim 1, wherein the ferrite compound is an oxide composed of said at least one metal and iron.

3. Ferromagnetic metal particles as claimed in claim 1, wherein said particles are acicular and the length of the major axis thereof is at most 0.3 μm.

4. Ferromagnetic metal particles as claimed in claim 1 or 2, wherein the saturation magnetization ($\sigma s^*$) of the particles, after corrosion testing for one week at 60° C. and 90% relative humidity exceeds the value expressed by the following equation:

$$\sigma s^*(\text{emu/g}) = 80 + 100 \times \text{particle length (μm)}.$$

5. Ferromagnetic metal particles as claimed in claim 1 or 2, wherein the atomic ratio of the iron to the metal in the ferrite compound is in the range of 0.1/1.0 to 10.0/1.0.

6. Ferromagnetic metal particles as claimed in claim 1 or 2, wherein the weight ratio of the iron in the ferrite compound to that in the oxyhydroxide is in the range of 0.3 to 200% by weight.

7. A process for the preparation of ferromagnetic metal particles comprising the steps of: (1) neutralizing an iron salt and at least one salt of a metal selected from the group consisting of cobalt, zinc, manganese, aluminum, chromium, nickel and copper having a different valency than the iron in the presence of dispersed particles of an oxyhydroxide composed mainly of iron, whereby there is formed a layer of a ferrite compound having a spinel structure on the whole surface of the oxyhydroxide particles; (2) heating the ferrite-covered oxyhydroxide particles; (3) reducing the heated particles; and (4) oxidizing the surface of the oxyhydroxide particles, whereby there is produced the ferromagnetic metal particles.

8. The process as claimed in claim 7, wherein the at least one metal salt is bivalent and the iron is ferric ion.

9. The process as claimed in claim 7, wherein the at least one metal salt is tervalent and the iron is ferrous ion.

10. The process as claimed in claim 7, wherein the particles of the oxyhydroxide mainly of iron are dispersed with a dispersant to form a slurry.

11. The process as claimed in claim 7, including the step of adding during said neutralization step at least one compound selected from the group consisting of Si, Al, P and B.

12. The process as claimed in any one of claims 7 through 11, wherein the particles of the oxyhydroxide mainly of iron are those in the morphological state of either $\alpha$-, $\beta$- or $\gamma$-FeOOH or those formed by coprecipitating at least one meal selected from the group consisting of P, Si, Al, Ti, Cr, Mn, Co, Ni and Zn with the iron oxyhydroxide particles.

13. The process as claimed in any one of claims 10 through 11, wherein the atomic ratio of the iron to the metal in the ferrite compound is in the range of 0.1/1.0, to 10.0/1.0.

14. The process as claimed in any one of claims 10 through 11, wherein the weight ratio of the iron in the ferrite compound to the iron in the oxyhydroxide particles is in the range of 0.3 to 200% by weight.

15. The process as claimed in claim 12, wherein the atomic ratio of the iron to the metal in the ferrite compound is in the range of 0.1/1.0 to 10.0/1.0.

16. The process as claimed in claim 12, wherein the weight ratio of the iron in the ferrite compound to the iron in the oxyhydroxide particles is in the range of 0.3 to 200% by weight.

* * * * *